(12) United States Patent
Sugano

(10) Patent No.: US 8,810,864 B2
(45) Date of Patent: Aug. 19, 2014

(54) APPARATUS CAPABLE OF CONTROLLING OUTPUT USING TWO-DIMENSIONAL CODE, AND CONTROL METHOD AND PROGRAM THEREOF

(71) Applicant: Canon Kabushiki Kaisha, Tokyo (JP)

(72) Inventor: Yasuharu Sugano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 21 days.

(21) Appl. No.: 13/718,145

(22) Filed: Dec. 18, 2012

(65) Prior Publication Data

US 2013/0169995 A1 Jul. 4, 2013

(30) Foreign Application Priority Data

Dec. 28, 2011 (JP) ................. 2011-288010

(51) Int. Cl.
- *H04N 1/40* (2006.01)
- *G06F 3/12* (2006.01)
- *H04N 1/00* (2006.01)
- *G03G 21/04* (2006.01)

(52) U.S. Cl.
CPC ....... *H04N 1/00875* (2013.01); *H04N 1/00846* (2013.01); *H04N 1/00925* (2013.01); *G03G 21/04* (2013.01); *H04N 2201/0094* (2013.01)
USPC ......................................... 358/3.28; 358/1.15

(58) Field of Classification Search
USPC ................... 358/3.28, 1.15; 347/16
See application file for complete search history.

(56) References Cited

U.S. PATENT DOCUMENTS

2007/0064036 A1* 3/2007 Hasuike ........................ 347/16
2011/0304879 A1* 12/2011 Kakutani .................. 358/1.15

FOREIGN PATENT DOCUMENTS

JP       2009-284472       12/2009

* cited by examiner

*Primary Examiner* — Charlotte M Baker
(74) *Attorney, Agent, or Firm* — Fitzpatrick, Cella, Harper & Scinto

(57) ABSTRACT

In the case that a secure mode is applied to an MFP which handles both of a QR code and an LVBC, there is a problem that convenience is lost also in LVBC utilization. An apparatus, comprising a unit configured to: enable to set any of a normal mode and a secure mode in determining whether or not to allow output of a document image, in the case that a first mode utilizing a partial code included in the document image is set; and enable setting of the normal mode and disable setting of the secure mode in determining whether or not to allow output of a document image, in the case that a second mode utilizing a whole code included in the document image is set.

7 Claims, 15 Drawing Sheets

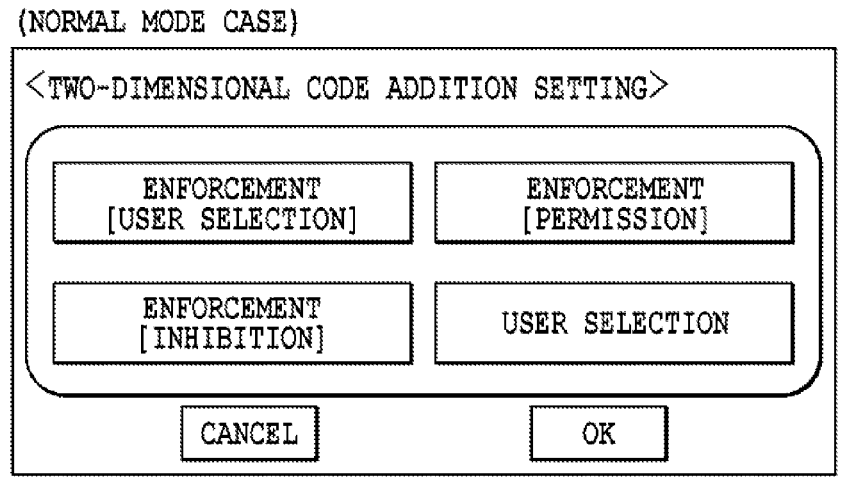
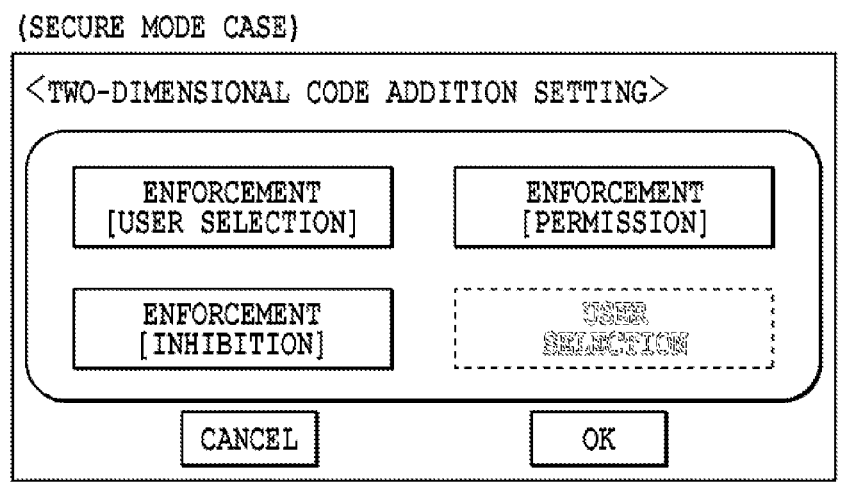
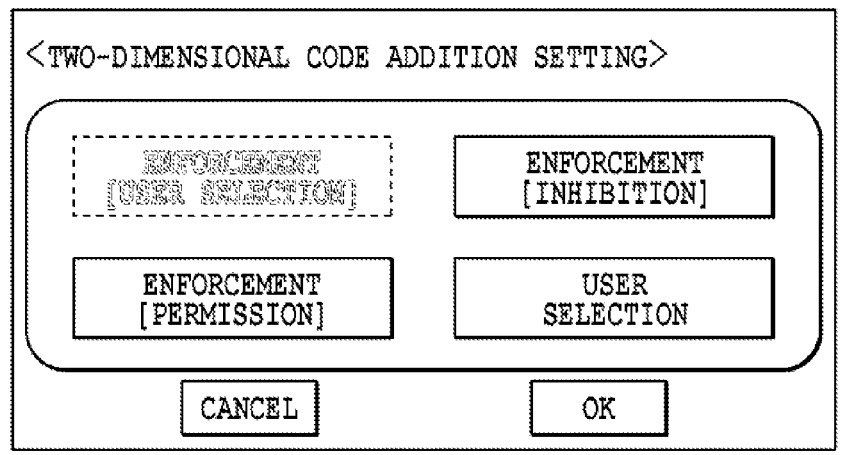

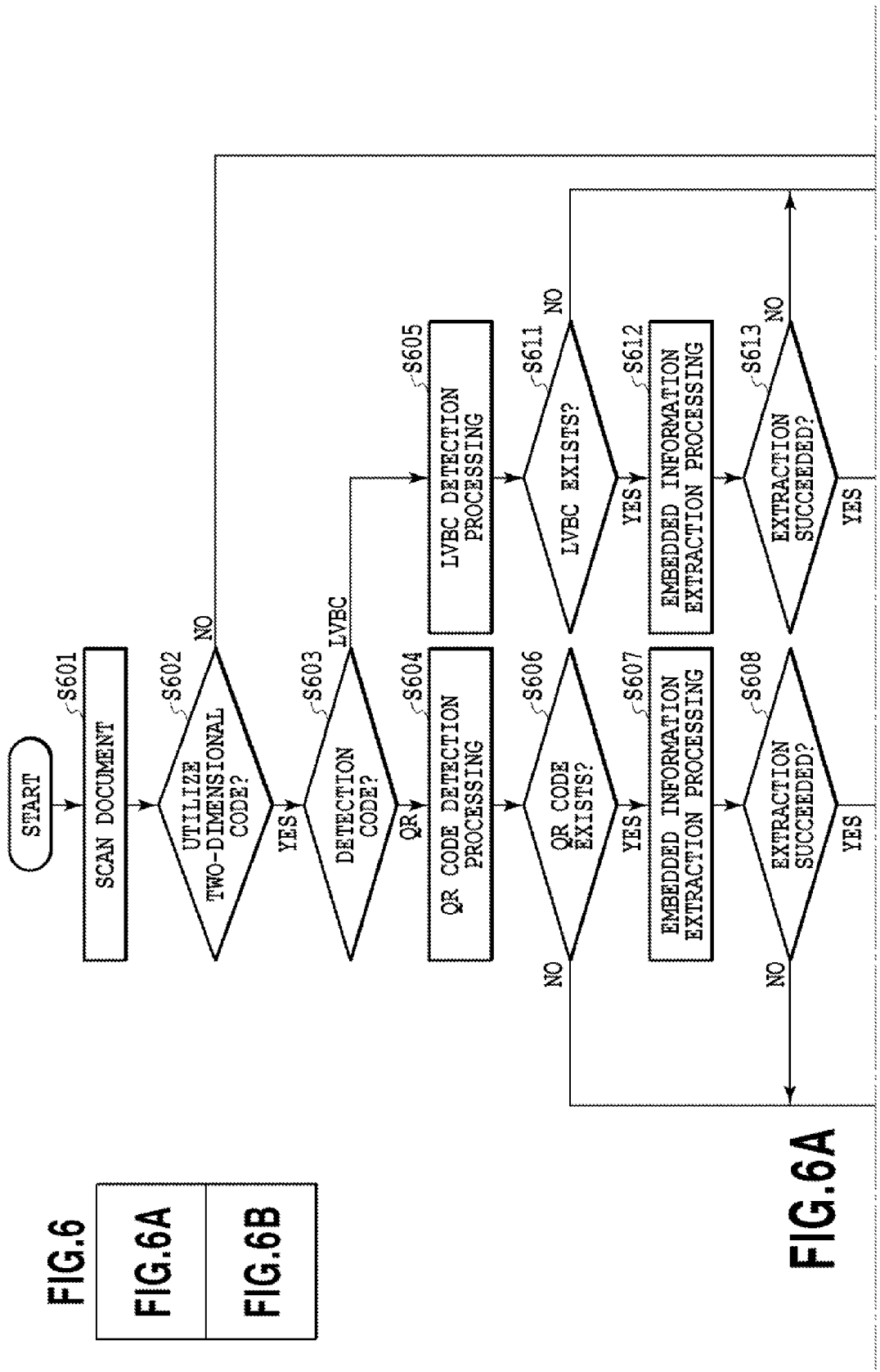

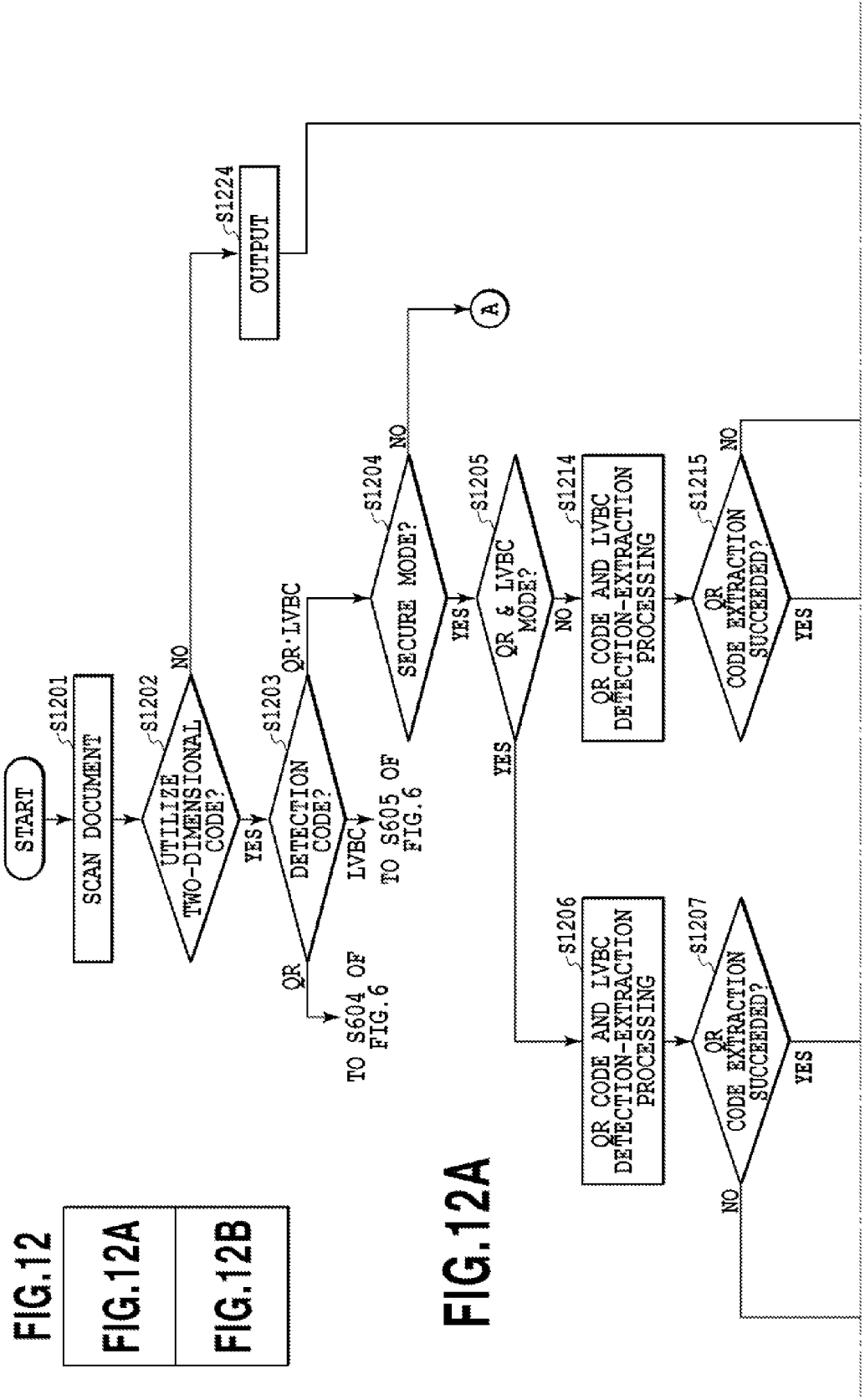

APPARATUS CAPABLE OF CONTROLLING OUTPUT USING TWO-DIMENSIONAL CODE, AND CONTROL METHOD AND PROGRAM THEREOF

BACKGROUND OF THE INVENTION

1. Field of the Invention

The present invention relates to an apparatus capable of controlling output of image data obtained by reading a document, by using a two-dimensional code added to the document, and to a control method and a program thereof.

2. Description of the Related Art

Along with recent spread of an MFP (Multi-Function Printer), there increases a problem of fraudulent document duplication. Further, the MFP includes various output functions other than duplication, such as BOX storage, E-mail, and FAX transmission. Accordingly, there is proposed a method of coping with fraudulent output of a document by adding a two-dimensional code, which includes information controlling such various types of output, to the document. Here, the information controlling output of a document (hereinafter, called "output control information") sometimes includes "output permission information" which indicates that output of duplication or the like is permitted, other than "output inhibition information" which indicates that output of duplication or the like is inhibited. In the present specification, among two-dimensional codes, a two-dimensional code like the QR code which is added to a part of a sheet such as an edge part of the sheet, so as not to overlap description contents in a document, is called a "partial code". Further, a two-dimensional code like an LVBC which is added to the whole surface of a sheet so as to partially overlap description contents in a document (note that the code is not necessarily added up to an edge part of the sheet), is called a "whole code". Here, the LVBC is an abbreviation of Low Visibility Bar Code, and also called a low-visibility barcode.

As operation modes of the MFP which can cope with the fraudulent duplication problem utilizing a two-dimensional code as described above, a normal mode and a secure mode are provided. Here, the normal mode is an operation mode which inhibits duplication or the like of a document only in the case that a two-dimensional code including the output inhibition information is added to the document. The secure mode is an operation mode which inhibits duplication or the like of a document not only in the case that a two-dimensional code including the output inhibition information is added to the document, but also in the case that a two-dimensional code is not added to the document.

The above secure mode permits duplication of a document only in the case that a two-dimensional code including the output permission information is added to the document, and therefore there arises a problem that almost all the documents cannot be duplicated. If such a secure mode can be set at any time, the secure mode is set inappropriately by mischief or a human error, and resultantly duplication of a necessary document or the like is restricted and the office inside may fall into malfunction. Setting of the secure mode, which has a negative side of largely sacrificing convenience, is to be made possible only in a limited situation.

Meanwhile, for the above partial code, there is a problem that the code is easily concealed or cut out. In the case that the partial code detection is set, the secure mode is effective for preventing behavior of an imprudent person, who tries to duplicate a document for which duplication or the like is inhibited, by concealing or cutting out a part where the partial code including the output inhibition information exists.

SUMMARY OF THE INVENTION

An apparatus according to the present invention is an apparatus, comprising a unit configured to: enable to set any of a normal mode and a secure mode in determining whether or not to allow output of a document image, in the case that a first mode utilizing a partial code included in the document image is set; and enable setting of the normal mode and disable setting of the secure mode in determining whether or not to allow output of a document image, in the case that a second mode utilizing a whole code included in the document image is set.

According to the present invention, even in the case that a two-dimensional code is utilized for controlling duplication of document and the like, it is possible to operate an MFP and the like while securing convenience.

Further features of the present invention will become apparent from the following description of exemplary embodiments (with reference to the attached drawings).

BRIEF DESCRIPTION OF THE DRAWINGS

FIGS. 1A and 1B are diagrams showing examples of a document to which a two-dimensional code is added, in which FIG. 1A shows a document to which a QR code is added and FIG. 1B shows a document to which an LVBC is added;

FIG. 3 is a flowchart showing a flow of initial setting processing for administrator setting which is executed when the MFP according to Embodiment 1 is powered on;

FIGS. 4A to 4D show examples of a setting screen for utilization setting of a two-dimensional code, in which FIGS. 4A and 4B are screens for designating utilization or non-utilization and FIGS. 4C and 4D are setting screens for setting details of the non-utilization;

FIGS. 5A to 5C are examples of a two-dimensional code addition setting screen, and correspond to a normal mode in QR code utilization, a secure mode in QR code utilization, and a normal mode in LVBC utilization, respectively;

DESCRIPTION OF THE EMBODIMENTS

[Embodiment 1]

In Embodiment 1, there will be explained an aspect in which the secure mode is applied only to the partial code in an apparatus which outputs image data by reading a document and can utilize both of the partial code and the whole code.

Figure 1A:
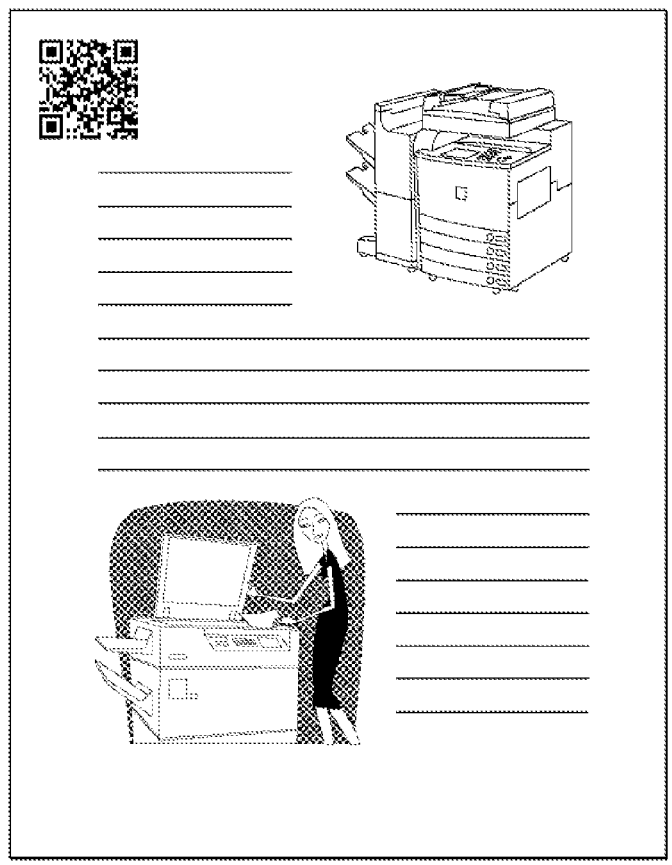
Figure 1B:
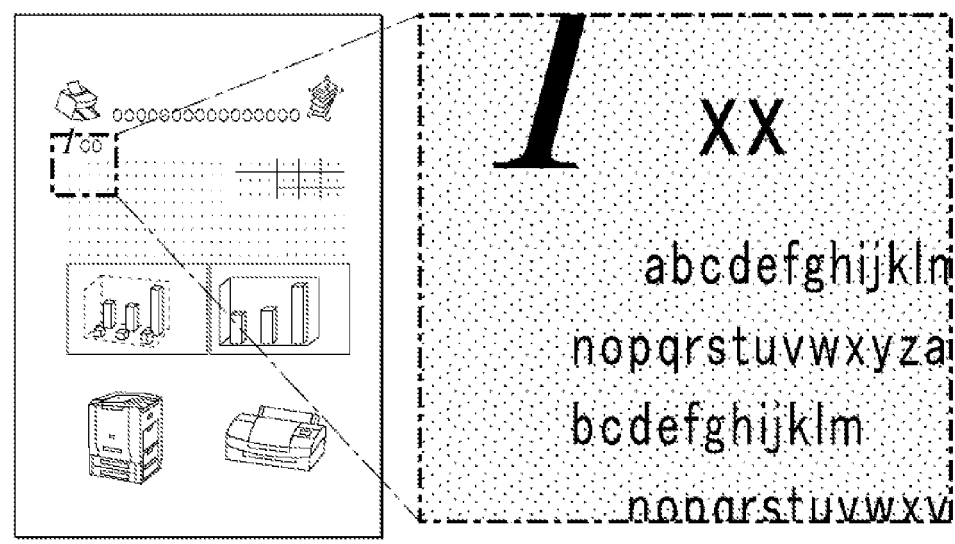

FIGS. 1A and 1B are diagrams each showing an example of a document to which a two-dimensional code is added, in which FIG. 1A shows a document to which a QR code is added and FIG. 1B shows a document to which an LVBC is added.

As described above, for the whole code such as the LVBC, a predetermined encoded image (dot pattern configured with large and small dots) is added to almost the whole surface of a recording medium such as paper (refer to FIG. 1B). Accordingly, it is difficult to perform the fraudulent duplication by finger concealing or cutting-out as in a case of the QR code in which a predetermined encoded image is added only to a part of a recording medium. Therefore, the Embodiment 1 places priority on convenience and makes it impossible to set the secure mode for the whole code such as the LVBC.

Note that, in the present specification, a "document" is assumed to indicate a printed material in which a figure or the like including the above two-dimensional code in addition to a character and a photograph is printed on a recording medium such as a paper.

First, there will be explained a technical matter which is a base of the present embodiment.

(Two-dimensional Code)

The two-dimensional code is broadly divided into the partial code and the whole code. In the present embodiment, there will be explained a case in which the QR code is used as the partial code and the LVBC is used as the whole code, but obviously this does not intend to limit the application scope of the present invention to the QR code and the LVBC.

(MFP operation mode)

Operation modes for output control in an MFP include two kinds of operation mode; the normal mode and the secure mode as described above.

In the normal mode, output such as duplication is inhibited only in the case that the two-dimensional code including the output inhibition information is added to a document. That is, the normal mode is an operation mode in which duplication or the like of a document is executed in the case that the two dimensional code of output permission is added to the document or in the case that the two-dimensional code itself is not added to the document.

Meanwhile, in the secure mode, duplication or the like of a document is inhibited not only in the case that the two-dimensional code including the output inhibition information is added to the document but also in the case that the two-dimensional code itself is not added to the document. That is, the secure mode is an operation mode in which output such as duplication of a document is executed only in the case that the two-dimensional code of output permission is added to the document.

In either operation mode, output is controlled according to the output control information in the case that the two-dimensional code is added to a document. That is, duplication or the like is executed in the case that the two-dimensional code including the output permission information is added, and the duplication or the like is not executed and an error screen, for example, is displayed in the case that the two-dimensional code including the output inhibition information is added.

(Creation of a Document Having the Two-dimensional Code)

A document to which the two-dimensional code including the output control information is added is created as follows.

1) The output control information is encoded and embedding information is obtained.

2) The embedding information is converted into an image and a two-dimensional code (image data is generated.

3) The two-dimensional code and a document image (image data are combined.

4) Printing is performed using the document image data combined with the two-dimensional code.

(Extraction of the Output Control Information from a Document Having the Two-dimensional Code)

Extraction of the output control information from a document to which the two-dimensional code is added is performed as follows.

1) A document placed on a platen or an ADF (Auto Document Feeder) is read and document image data is generated.

2) It is confirmed whether the two-dimensional code exists within the generated document image data (hereinafter, this confirmation is called "detection"). Here, when the document is read in an MFP, setting which detects the QR code from the obtained document image data is called a QR detection mode, and setting which detects the LVBC is called an LVBC detection mode. Note that details of detection processing of the QR code and the LVBC are not included in the gist of the present invention and thus explanation will be omitted.

3) The two-dimensional code detected by the detection processing is decoded and the output control information is obtained (hereinafter, taking-out of the output control information from the two-dimensional code by this decoding is called "extraction").

(Addition Setting of the Two-dimensional Code)

A condition setting when the two-dimensional code including the output control information is added to an output document of duplication or the like includes four kinds of mode; 1) Enforcement [Permission], 2) Enforcement [Inhibition], 3) Enforcement [User selection], and 4) User selection.

Enforcement [Permission] is a mode in which the two-dimensional code is invariably added to document image data to be output, and also a mode in which the content of the output control information thereof is limited to output permission.

Enforcement [Inhibition] is a mode in which the two-dimensional code is invariably added to document image data to be output, and also a mode in which the content of the output control information thereof is limited to output inhibition.

Enforcement [User selection] is a mode in which the two-dimensional code is invariably added to document image data to be output, but the content of the output control information thereof can be selected by a user.

User selection is a mode in which a user can select whether the two-dimensional code is to be added or not to document image data to be output, and, in the case of addition, can select whether the content of the output control information thereof is output permission or output inhibition.

(Setting of the Various Kinds of Mode)

Various kinds of setting, change, and release for the two-dimensional code are not allowed to be performed by a general user or a guest user, but allowed to be performed only by an administrator. A setting item for which setting or the like is allowed to be performed only by an administrator in this manner is called "administrator setting", hereinafter.

Figure 2:
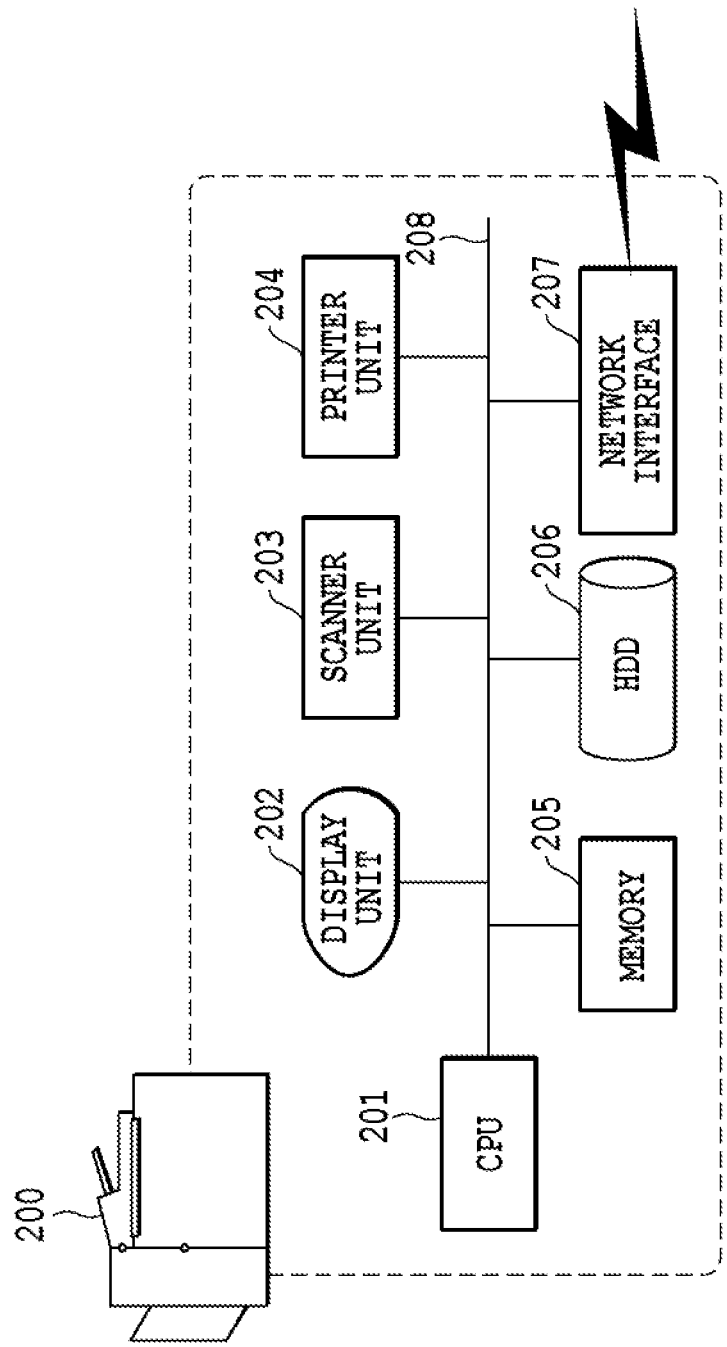
FIG. 2 is a block diagram showing a configuration of an MFP as an apparatus according to Embodiment 1.

FIG. 2 is a block diagram showing a configuration of an MFP 200 as an apparatus according to the present embodiment.

A CPU 201 is a processor controlling the MFP 200 in an integrated manner and controls individual units connected with each other via an internal bus 208. Further, the CPU 201 also performs encoding, decoding, and the like of the two-dimensional code.

A display unit 202 is configured with an image display device such as a touch panel, and displays various kinds of information on a screen and also receives various kinds of operation such as duplication instruction from a user. Various kinds of setting operation by an administrator are performed via the touch panel in the display unit 202.

A scanner unit 203 has a function of reading (scanning) a document placed on a platen which is not shown in the drawing and a function of obtaining image data of the document.

A printer unit 204 has a function of printing and outputting an image onto a recording medium such as a paper according to the document image data.

A memory 205 is configured with a ROM which stores various kinds of command executed for the CPU 201 to control the MFP 200 (including an application program) and a RAM which performs development of the various kinds of command and temporary storage of other data.

An HDD 206 is a large capacity storage unit retaining data such as the document image data obtained by the scanning in the scanner unit 203 and various kinds of setting value.

A network interface 207 performs transmission and reception of various kinds of data via a network under the control of the CPU 201.

Other than the above functions, while not illustrated in FIG. 2, in particular, the MFP 200 also has output functions other than duplication (e.g., functions such as BOX storage, FAX, and Mail).

Figure 3:
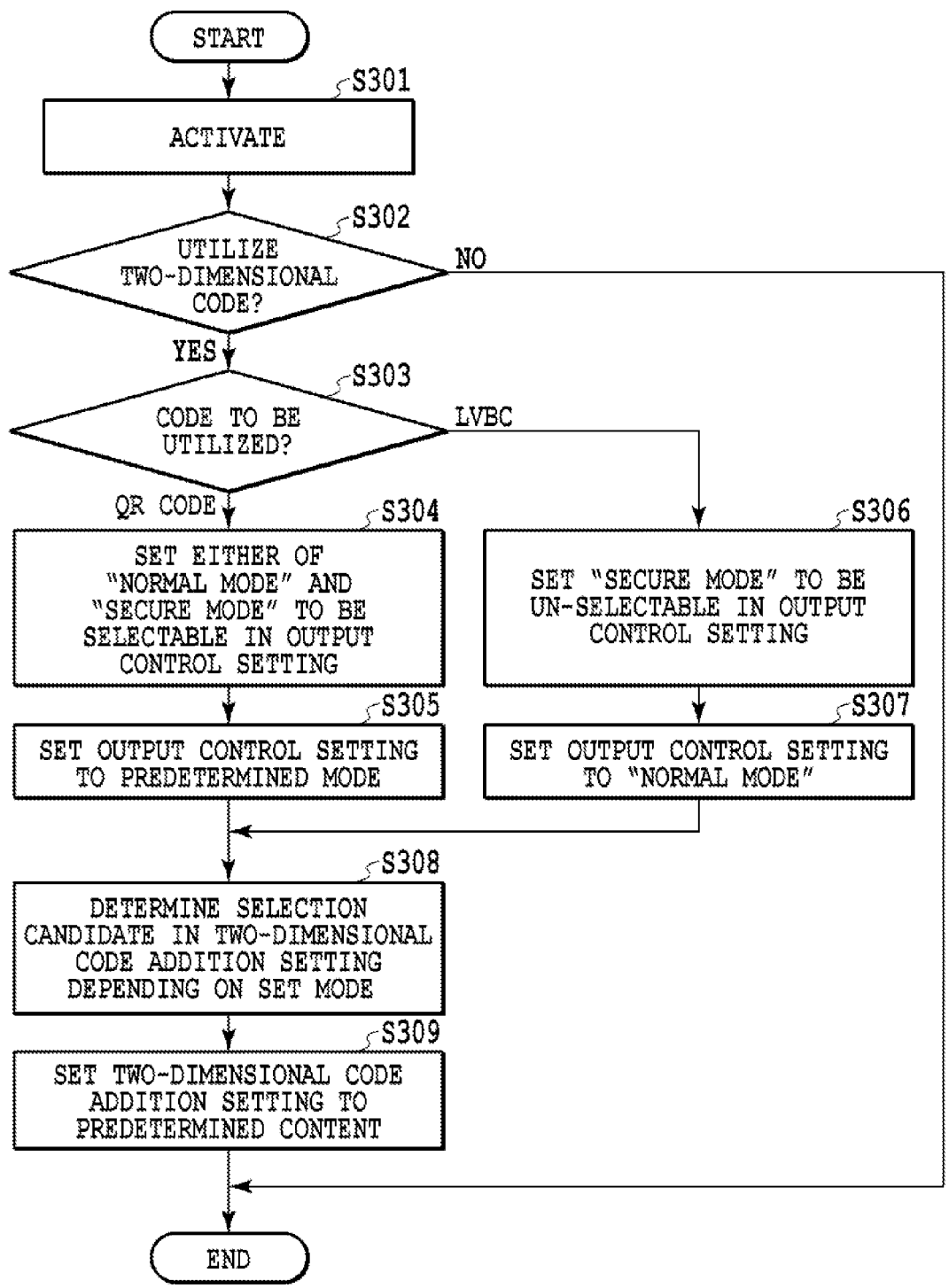

FIG. 3 is a flowchart showing a flow of initial setting processing for administrator setting executed when the MFP 200 according to the present embodiment is powered on. Here, this processing is realized by the CPU 201 executing a program read from the HDD 206 into the RAM.

In step 301, the CPU 201 executes predetermined activation processing to activate the MFP 200 system normally.

Figure 4A:
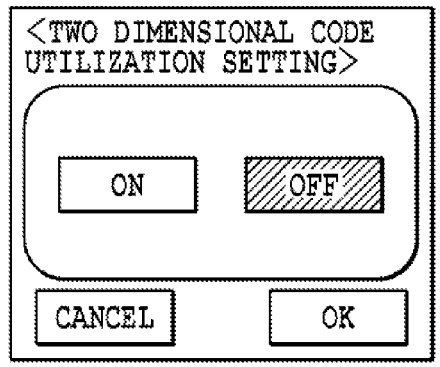
Figure 4B:
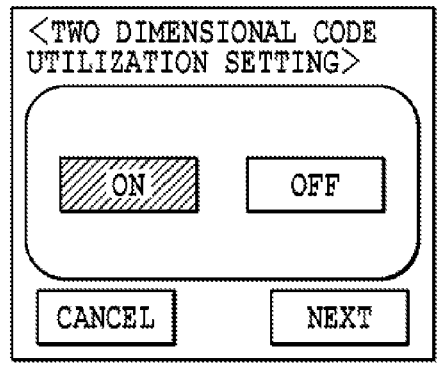

In step 302, the CPU 201 determines whether setting utilizing the two-dimensional code is set or not. Specifically, the CPU 201 reads the content of "two-dimensional code utilization setting" stored in the HDD 206 and determines whether the setting is set to Utilization (ON) or set to Non-utilization (OFF). FIGS. 4A and 4B are examples of a setting screen for designating Utilization and Non-utilization of the two-dimensional code. The content previously designated via such a setting screen (setting content used in the immediately previous use of the MFP) is stored in the HDD 206, and the determination processing is performed here according to the stored information. Here, FIG. 4A shows a state that "OFF" is selected ("OFF" part is highlighted) and FIG. 4B shows a state that "ON" is selected ("ON" part is highlighted and a "Next" button is displayed for performing detail setting). Then, if the result of the determination shows that the content of the two-dimensional code utilization setting is "OFF", the process exits the present processing. In this case, the two-dimensional code detection and extraction is not performed in document reading and also addition of the two-dimensional code for an output document is not performed. On the other hand, if the two-dimensional code utilization setting is "ON", the process proceeds to step 303.

Figure 4C:
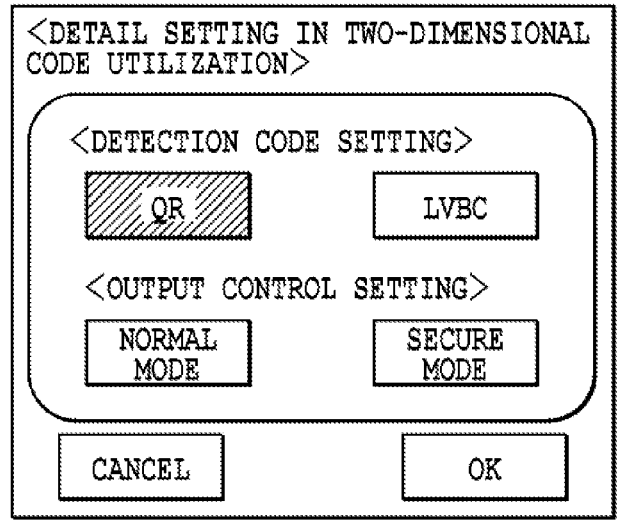
Figure 4D:
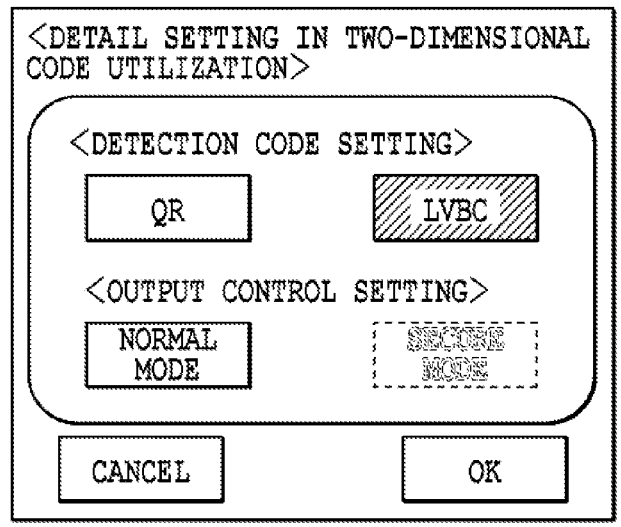

In step 303, the CPU 201 determines whether the QR code is set or the LVBC is set as the two-dimensional code to be utilized. Specifically, the CPU 201 reads the content of "detection code setting" in "detail setting in two-dimensional code utilization" stored in the HDD 206, and determines whether the setting content is QR code detection (partial code detection setting) or LVBC detection (whole code detection setting). Each of FIGS. 4C and 4D is an example of a setting screen for performing the detail setting in the two-dimensional code utilization. The content designated previously in such a setting screen (setting content used in the immediately previous use of the MFP) is stored in the HDD 206, and the determination processing is performed here according to the stored information. Here, in FIG. 4C, "QR" part of the detection code setting is highlighted and, in FIG. 4D, "LVBC" part of the detection code setting is highlighted. This shows that the QR code is selected in FIG. 4C and the LVBC is selected in FIG. 4D. If the result of the determination shows that the QR code is set as the two-dimensional code to be detected, the process proceeds to step 304, and, if the LVBC is set, the process proceeds to step 306.

In step 304, the CPU 201 causes "output control setting" of "detail setting in two-dimensional code utilization" to have a state in which either of the normal mode and the secure mode can be designated. That is, in the case that the QR mode is set as the two-dimensional code to be utilized and also in the case that the partial code is not included in the document image, there is displayed a screen which causes the administrator to select whether or not to permit output of the document image. Then, depending on administrator's selection, either the normal mode (output is permitted for the document image without including the partial code) or the secure mode (output is inhibited for the document image without including the partial code) is set. For the output control setting, while both of the normal mode button and the secure mode button are displayed in solid lines in FIG. 4C, only the normal mode button is displayed in a solid line and the secure mode button is displayed in a broken line in FIG. 4D. The former is a state in which either of the normal mode and the secure mode can be designated, and the latter is a state in which the secure mode cannot be selected. Note that, instead of the broken line display, display of the button itself may be deleted for displaying the state that the secure mode cannot be selected.

In step 305, the CPU 201 sets the mode to be applied for "output control setting" to a predetermined mode. For example, a mode which was used in the immediately previous use of the MFP, a mode which is designated preliminarily as a default mode, or the like is set. Note that the designation of the default may be performed by a method of checking a check box provided for each item of the output control setting, or the like, for example.

In step 306, the CPU 201 sets "output control setting" of "detail setting in two-dimensional code utilization" to a state in which only the normal mode can be selected (the secure mode cannot be selected). That is, in the case that the LVBC is set as the two-dimensional code to be utilized, the normal mode, which is a mode to permit the output of the document image in the case that the partial code is not included in the document image, is set invariably.

In step 307, the CPU 201 sets the mode to be applied for "output control setting" to the normal mode.

In step 308, the CPU 201 determines a selection candidate in "two-dimensional code addition setting" depending on the mode set in the output control setting. Any of FIGS. 5A to 5C shows an example of a two-dimensional code addition setting screen.

For example, in the case that the output control setting is set to the normal mode in step 305, as shown in FIG. 5A, the CPU 201 sets a state in which all the above described four kinds of condition; 1) Enforcement [permission], 2) Enforcement [Inhibition], 3) Enforcement [User selection], and 4) User selection, can be selected. Further, in the case that the output control setting is set to the secure mode in step 305, as shown in FIG. 5B, the CPU 201 sets a state in which 4) User selection cannot be selected. The reason of such setting is that, since all the outputs such as duplication cannot be performed if the QR code is not added to the document in the secure mode, the addition of the QR code is prevented from being forgotten.

Meanwhile, in the case that the output control setting is set to the normal mode in step 307, as shown in FIG. 5C, the CPU 201 sets a state in which 3) Enforcement [User selection] cannot be selected.

Note that, as in the case of output control setting, display of the button itself may be deleted for displaying the un-selectable state, instead of the broken line display.

In step 309, the CPU 201 sets a content to be applied to "two-dimensional code addition setting" to a predetermined content. For example, a setting content which was used in the immediately previous use of the MFP, a content which is designated preliminarily as a default setting content, or the like is set. Note that the designation of the default may be performed by a method of checking a check box provided for each item of the two-dimensional code addition setting, or the like, for example.

As described above, the initial setting processing for the administrator setting is performed every time the MFP 200 is powered on.

After that, as needed, the administrator can perform change between the two-dimensional code utilization and non-utilization and change of the detail setting in the two-dimensional code utilization. For example, in the case that the two-dimensional code utilization setting is desired to be changed from ON to OFF, the administrator calls up the above described setting screen of FIGS. 4A to 4D on the display unit 202 after the initial setting processing has been finished, and presses down the "OFF" button on the setting screen and successively presses down the "OK" button. At this time, authentication processing by a password or the like is performed as needed for confirming the administrator.

As far as the initial setting processing is performed as described above and the LVBC is selected as the two-dimensional code to be utilized, even the administrator cannot select "secure mode" in "output control setting". For example, in the case that, after the above initial setting processing, the administrator changes the detection code setting content from the QR code to the LVBC in the detail setting screen in the two-dimensional code utilization, in response, the selection candidates in the output control setting are also switched as shown in FIG. 4D. Similarly, even the administrator cannot select "User selection" in "two-dimensional code addition setting" as far as the QR code is selected as the two-dimensional code to be utilized and also the secure mode is selected.

Figure 6B:
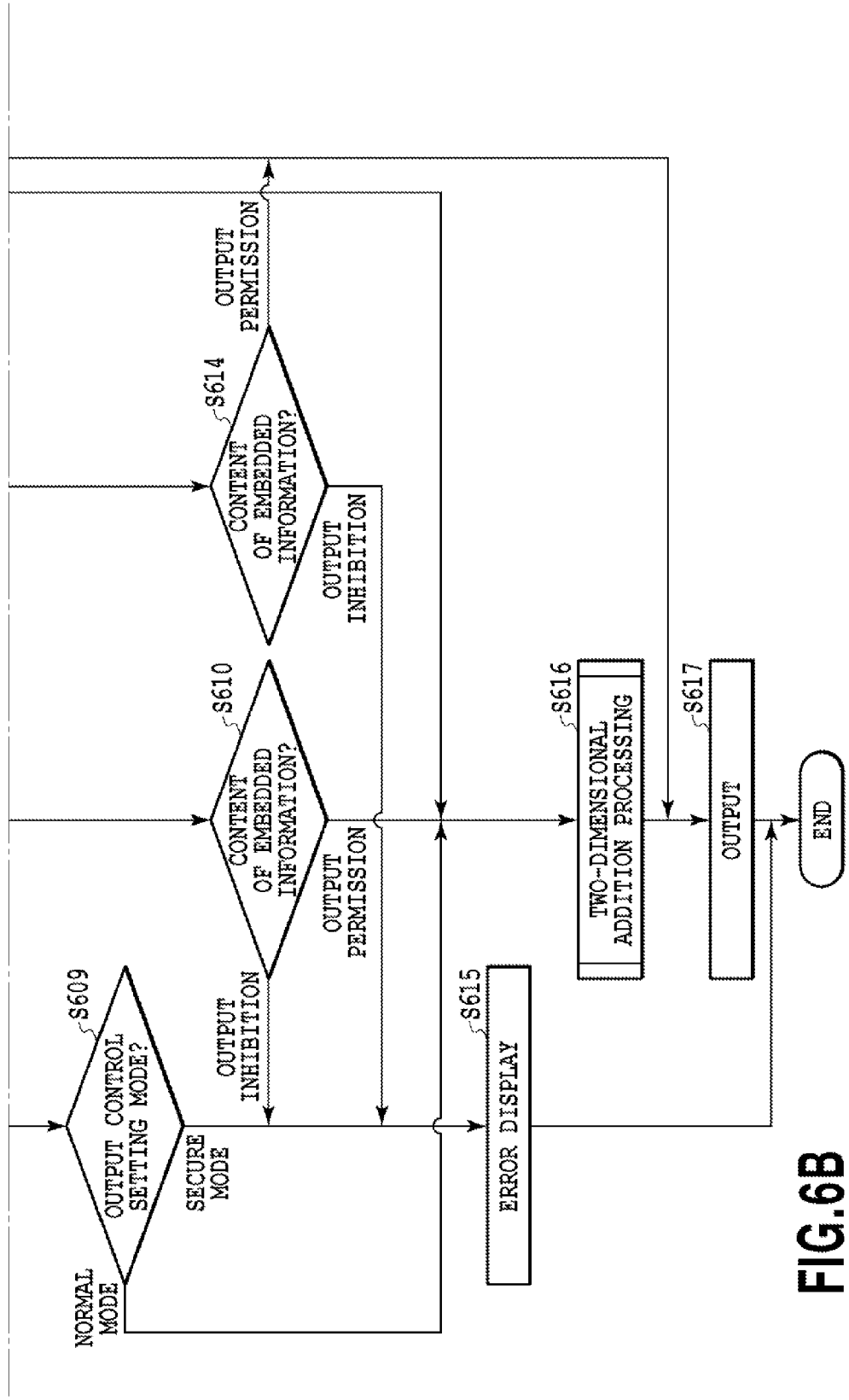
FIG. 6 is a diagram showing a relationship between FIGS. 6A and 6B, and FIGS. 6A and 6B are flowcharts showing a flow when a document is duplicated by the MFP according to Embodiment 1.

FIGS. 6A and 6B are flowcharts showing a flow in the case that a document is duplicated by the MFP 200 according to the present embodiment. This processing is realized by the CPU 201 executing a program read from the HDD 206 into the RAM. Note that, while a case for duplication will be explained in the following, obviously this processing is also applied similarly to other output modes such as the BOX storage.

When duplication request operation is received from a user, the scanner unit 203 scans a document to be duplicated and document image data is generated (step 601).

Successively, it is determined whether the setting of utilizing the two-dimensional code is set or not, with reference to information stored in the HDD (step 602). In the case that the setting of utilizing the two-dimensional code is set, QR code or LVBC detection processing is performed according to the setting content of the detection code setting (if YES in step 602, step 603 to step 605). On the other hand, in the case that the setting of not utilizing the two-dimensional code is set, print processing is immediately executed using the document image data obtained by the scanning (if NO in step 602, step 617).

<Case for Partial Code Detection Setting>

In the case that the QR code is designated in the detection code setting, if existence of the QR code is confirmed by the detection processing, the process goes to embedded information extraction processing (if YES in step 606, step 607). On the other hand, if the existence of the QR code cannot not be confirmed, the process goes to confirmation of the mode which has been set in the output control setting (if NO in step 606, step 609). If the normal mode is confirmed in step 609, the process goes to two-dimensional code addition processing (step 616), and, if the secure mode is confirmed, a message that output is not possible is displayed on the display unit 202 (step 615). Note that details of the two-dimensional code addition processing will be described below.

In the case that extraction has succeeded in the embedded information extraction processing of step 607 (YES in step 608), if the extracted embedded information is the output permission information, the process goes to the two-dimensional code addition processing (step 610 and step 616). For the case of the QR code, differently from the case of the LVBC to be described below, a new QR code can be added without a problem by a method of updating each rectangular region including a peripheral region of the QR code or the like, and thereby the two-dimensional code addition processing is performed. On the other hand, if the extracted embedded information is output inhibition information, a message that output is not possible is displayed on the display unit 202 (step 610 and step 615).

In the case that the extraction has failed in the embedded information extraction processing of step 607, resultantly it is determined that the QR code is not added, and the process goes to the confirmation of the mode in the output control setting (if NO in step 608, step 609). In step 609, if the normal mode is confirmed, the step goes to the two-dimensional code addition processing (step 616) and, if the secure mode is confirmed, a message that output is not possible is displayed on the display unit 202 (step 615).

<Case for Whole Code Detection Setting>

Meanwhile, in the case that the LVBC is designated in the detection code setting, LVBC detection processing is performed (step 605), and, if existence of the LVBC is confirmed, the process goes to embedded information extraction processing (if YES in step 611, step 612). On the other hand, in the case that the existence of the LVBC cannot be confirmed, without performing determination of the mode in the output control setting, the process goes to two-dimensional code addition processing (if NO in step 611, step 616).

In the case that extraction has succeeded in the embedded information extraction processing of step 612 (YES in step 613), output processing is executed if the extracted embedded information is output permission information (step 614 and step 617). Here, the output processing is executed without two-dimensional code addition processing for the purpose of preventing a new LVBC from overlapping the existing LVBC to impair a function of an encoded image. On the other hand, if the embedded information is output inhibition information, a massage that printing cannot be performed is displayed on the display unit 202 (step 614 and step 615).

In the case that the extraction has failed in the embedded information extraction processing of step 612, resultantly it is determined that the LVBC is not added, and the process goes to the two-dimensional code addition processing (if NO in step 613, step 616).

Figure 7:
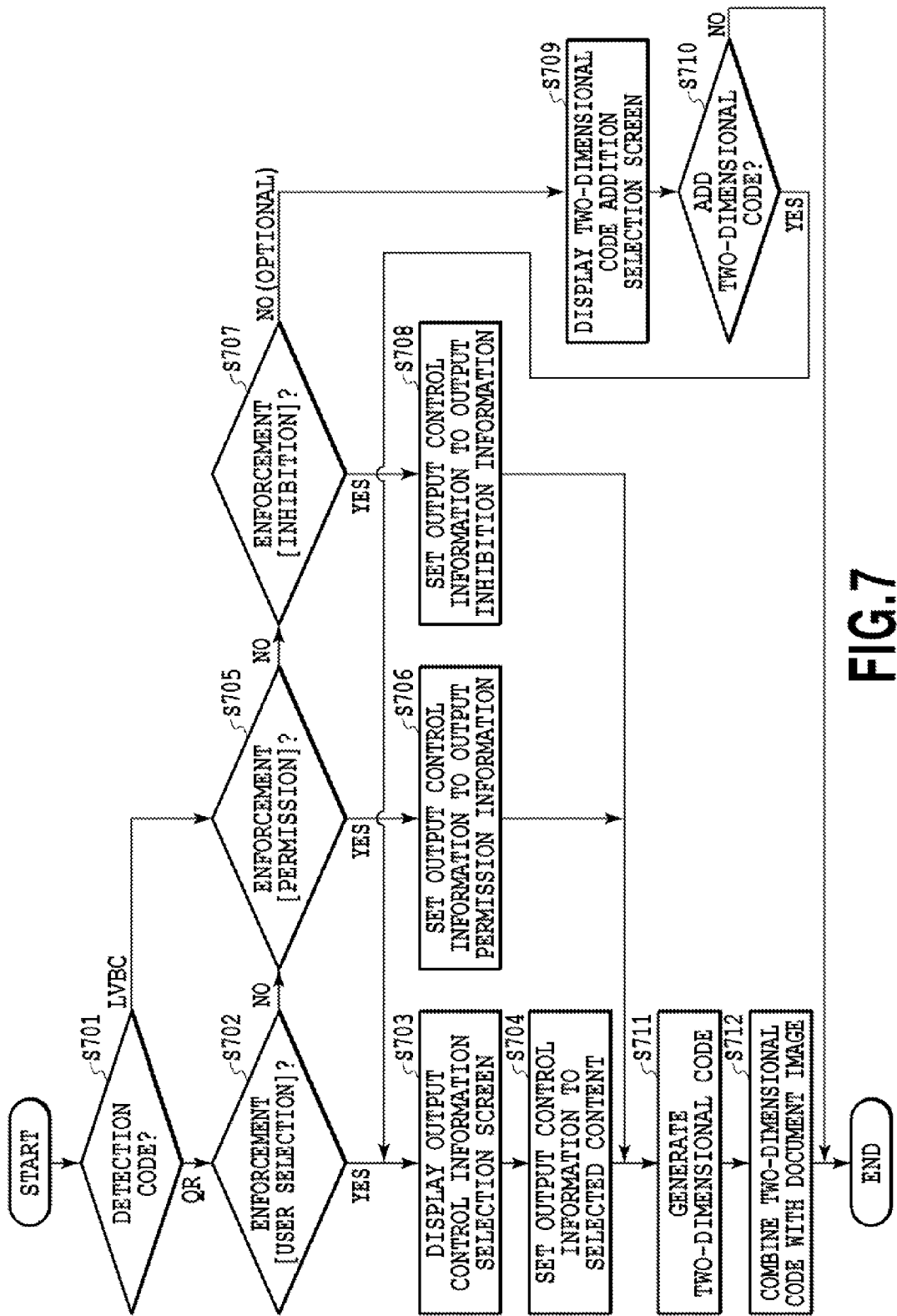
FIG. 7 is a flowchart showing details of two-dimensional code addition processing.

FIG. 7 is a flowchart showing details of the two-dimensional code addition processing in above step 616.

<Case that the QR Code is Designated in the Detection Code Setting>

In the case that the detection code is the QR code, that is, in the case that the QR code is designated as the code to be utilized, first, it is determined whether the content of the two-dimensional code addition setting is 3) Enforcement [User selection] or not (step 701 and step 702). In the case that it is determined that 3) Enforcement [User selection] is set, an output control information selection screen (not shown in the drawing) is displayed on the display unit 202, and the user is prompted to select the contents of the output control information (output inhibition or output permission) (step 703). Then, depending on the user's selection, the content of the output control information is determined (step 704).

In the case that the content of the two-dimensional code addition setting is determined not to be 3) Enforcement [User selection] in step 702, next, it is determined whether the content is 1) Enforcement [Permission] or not (step 705). If the content is 1) Enforcement [Permission] as a result of the determination, the content of the output control information is determined to be the output permission information (step 706).

In the case that the content of the two-dimensional code addition setting is determined not to be 1) Enforcement [Permission] in step 705, next, it is determined whether the content is 2) Enforcement [Inhibition] or not (step 707). If the content is 2) Enforcement [Inhibition] as a result of the determination, the content of the output control information is determined to be the output inhibition information (step 708). By the way, in the case that the secure mode is set, it is found at this stage that the content is 2) Enforcement [Inhibition], and therefore the process proceeds invariably to step 708 in the secure mode.

In the case that the content of the two-dimensional code addition setting is determined not to be 2) Enforcement [Inhibition] in step 707 (in the case that 4) User selection is selected in the normal mode), a two-dimensional code addition selection screen which is not shown in the drawing is displayed on the display unit 202 (step 709). Thereby, the user is prompted to select whether or not to add the two-dimensional code to the output document. If the user selects not to add the two-dimensional code (NO in step 710), the process exits the present processing without further processing. On the other hand, if the user selects to add the two-dimensional code (YES in step 710), next, the output control information selection screen (not shown in the drawing) is displayed on the display unit 202, and the user is prompted to select the contents of the output control information (output inhibition or output permission) (step 703). Then, depending on the user's selection, the content of the output control information is determined (step 704).

When the content of the output control information is determined, the two-dimensional code encoded according to the content is generated, (step 711), and the generated two-dimensional code is combined with the document image data (step 712).

<Case that the LVBC is Designated in the Detection Code Setting>

In the case that the detection code is the LVBC, that is, in the case that the LVBC is designated as the code to be utilized, first it is determined whether the content of the two-dimensional code addition setting is 1) Enforcement [Permission] or not (step 705). If the content of the two-dimensional code addition setting is 1) Enforcement [Permission] as a result of the determination, the content of the output control information is determined to be the output permission information (step 706).

In the case that the content of the two-dimensional code addition setting is determined not to be 1) Enforcement [Permission] in step 705, next, it is determined whether the content is 2) Enforcement [Inhibition] or not (step 707). If the content is 2) Enforcement [Inhibition] as a result of the determination, the content of the output control information is determined to be the output inhibition information (step 708).

In the case that the content of the two-dimensional code addition setting is not to be 2) Enforcement [Inhibition] in step 707, that is, in the case that the content is determined to be 4) User selection, the two-dimensional code addition selection screen (not shown in the drawing) is displayed on the display unit 202 (step 709). Thereby, the user is prompted to select whether or not to add the two-dimensional code to the output document. If the user selects not to add the two-dimensional code (NO in step 710), the process exits the present processing without further processing. On the other hand, if the user selects to add the two-dimensional code (YES in step 710), next, the output control information selection screen (not shown in the drawing) is displayed on the display unit 202, and the user is prompted to select the contents of the output control information (output inhibition or output permission) (step 703). Then, depending on the user's selection, the content of the output control information is determined (step 704).

When the content of the output control information is determined, the two-dimensional code encoded according to the content is generated (step 711), and the generated two-dimensional code is combined with the document image data (step 712).

As described above, the apparatus according to the present embodiment makes it possible to use the secure mode only in the case that the partial code such as the QR code is utilized as the two-dimensional code which is used for the control of the document duplication and the like. Then, in the case that the whole code such as the LVBC is utilized, use in the secure mode is made not possible. Thereby, even in the case that the two-dimensional code is utilized for the control of the document duplication and the like, it is possible to operate the MFP and the like without losing convenience.

[Embodiment 2]

Embodiment 1 explains the aspect in which the secure mode is made available only in the case that the partial code such as the QR code is utilized as the two-dimensional code which controls the output of the document duplication and the like. Then, in Embodiment 1, only the mode that the addition of the QR code is enforced in the two-dimensional code addition setting can be selected in the secure mode so as to cause the addition of the QR code not to be forgotten in the secure mode.

Next, as Embodiment 2, there will be explained an aspect that the content of the two-dimensional code addition setting is automatically changed to the content that the addition of the partial code is enforced, in the case that the normal mode is changed to the secure mode in a situation that 4) User selection is set under the condition of the partial code and also the normal mode.

The reason why the content of the two-dimensional code addition setting is changed in this manner automatically as above is that, since duplication or the like cannot be performed in the secure mode as far as the user does not select "addition" in the case that User selection is left not to be changed, the addition of the QR code is prevented in advance from being forgotten.

Figure 8:
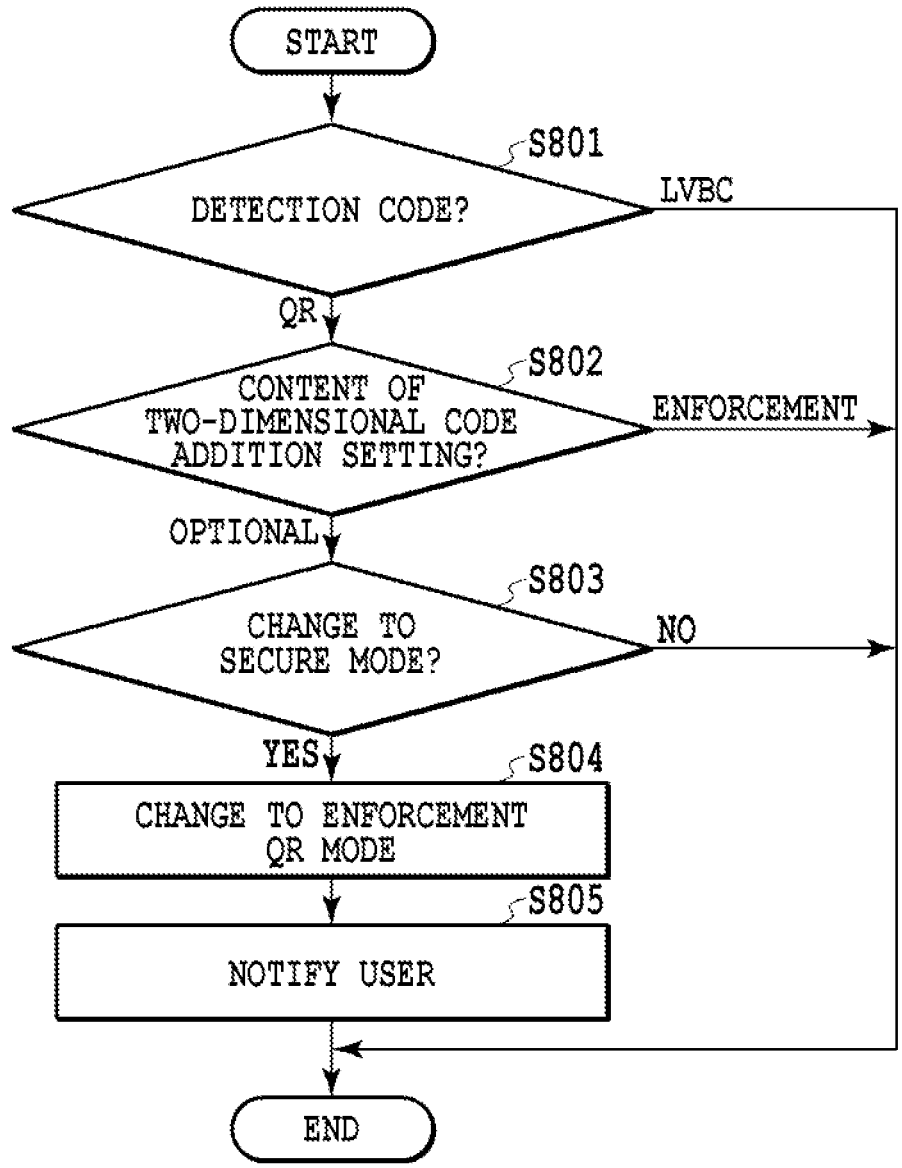
FIG. 8 is a flowchart showing a flow of automatic change processing for two-dimensional code addition setting according to Embodiment 2.

FIG. 8 is a flowchart showing a flow of automatic change processing of the two-dimensional code addition setting according to the present embodiment. This processing is realized by the CPU 201 executing a program read from the HDD 206 into the RAM.

After operation of the setting change has been completed by the administrator, in step 801, the CPU 201 confirms the content of the detection code setting with reference to a region of the HDD 206 where various kinds of setting value are stored. If the QR mode is selected, the process proceeds to step 802. On the other hand, if the LVBC mode is selected, the process exits the present processing.

In step 802, the CPU 201 confirms the content of the two-dimensional code addition setting. If 4) User selection is selected, the process proceeds to step 803. On the other hand, any content in which the addition is enforced is selected, the process exits the present processing.

In step 803, the CPU 201 confirms the content of the output control setting. If the normal mode is changed to the secure mode, the process proceeds to step 804. On the other hand, the normal mode is left not to be changed, the process exits the present processing.

In step 804, the CPU 201 changes the content of the two-dimensional code addition setting from 4) User selection to 3) Enforcement [User selection]. Note that, while the content is changed to 3) Enforcement [User selection] in the present embodiment, since the purpose is to prevent the QR code addition from being forgotten, the content may be changed to 1) Enforcement [Permission] or 2) Enforcement [Inhibition].

Figure 9:
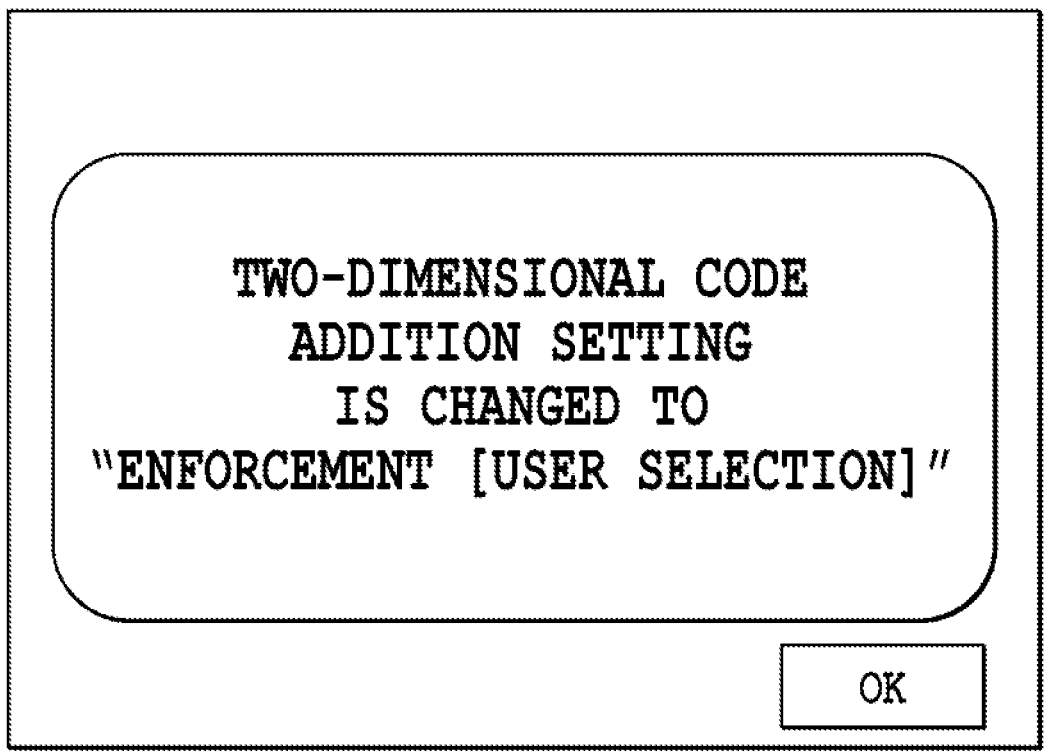
FIG. 9 is an example of a message shown on a display unit in Embodiment 2.

In step 805, the CPU 201 displays a message indicating the fact that the content of the output control setting is changed to 3) Enforcement [User selection] on the display unit 202 to notify the user of the fact. FIG. 9 shows an example of the message shown on the display unit 202. Note that, instead of the message display on the display unit 202, the notification may be given to the user by automatic transmission or the like of the above message to a preliminarily registered mail address of the administrator.

As described above, according to the present embodiment, since the addition of the two-dimensional code is automatically changed to have the content of enforcement in the case that the administrator changes the normal mode to the secure mode, it is possible to prevent the user from forgetting to add the two-dimensional code.

[Embodiment 3]

Embodiments 1 and 2 assume that the two-dimensional code to be utilized for the output control is either the partial code or the whole code. Next, there will be explained an aspect which can handle both of the partial code and the whole code, as Embodiment 3.

Figure 10:
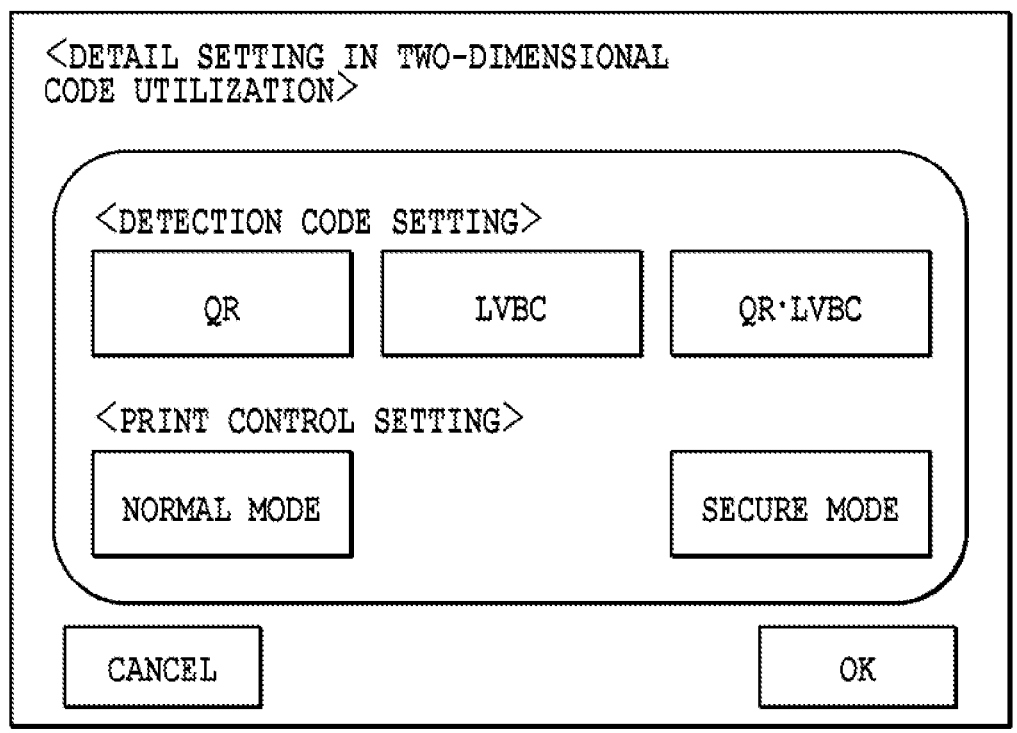
FIG. 10 is an example of a detail setting screen in two-dimensional code utilization according to Embodiment 3.

The present embodiment enables both of the QR code and the LVBC to be selected as the detection codes in the detection code setting, for a third option other than the QR code and the LVBC. FIG. 10 is an example of a two-dimensional code utilization detail setting screen according to the present embodiment, and a "QR•LVBC" button in the detection code setting of this screen shows a button to be used when both of the QR code and the LVBC are to be selected as the detection codes.

The present embodiment is configured to be able to set the secure mode in more detail so as to enable a more flexible operation in the case that the user selects the above third option. Specifically, in the case that both of the QR code and the LVBC are designated as the detection codes, the secured mode is configured to have plural kinds and either of "QR & LVBC mode" and "QR or LVBC mode" is made selectable. Here, "QR & LVBC mode" is a mode in which outputting is executed according to the output control information if the both of the QR code and the LVBC are detected from the document image data obtained by the scanning, but the outputting is inhibited if both cannot be detected. "QR or LVBC mode" is a mode in which the outputting is executed according to the output control information if either one of the QR code and the LVBC is detected from the document image data obtained by the scanning, but the outputting is inhibited if neither one is detected. Note that, while, in the present embodiment, the output control information of the LVBC is assumed to have priority, in the case that the content of the added output control information is contradictory between the QR code and the LVBC, it may be determined optionally which one has priority, according to use environment.

Figure 11:
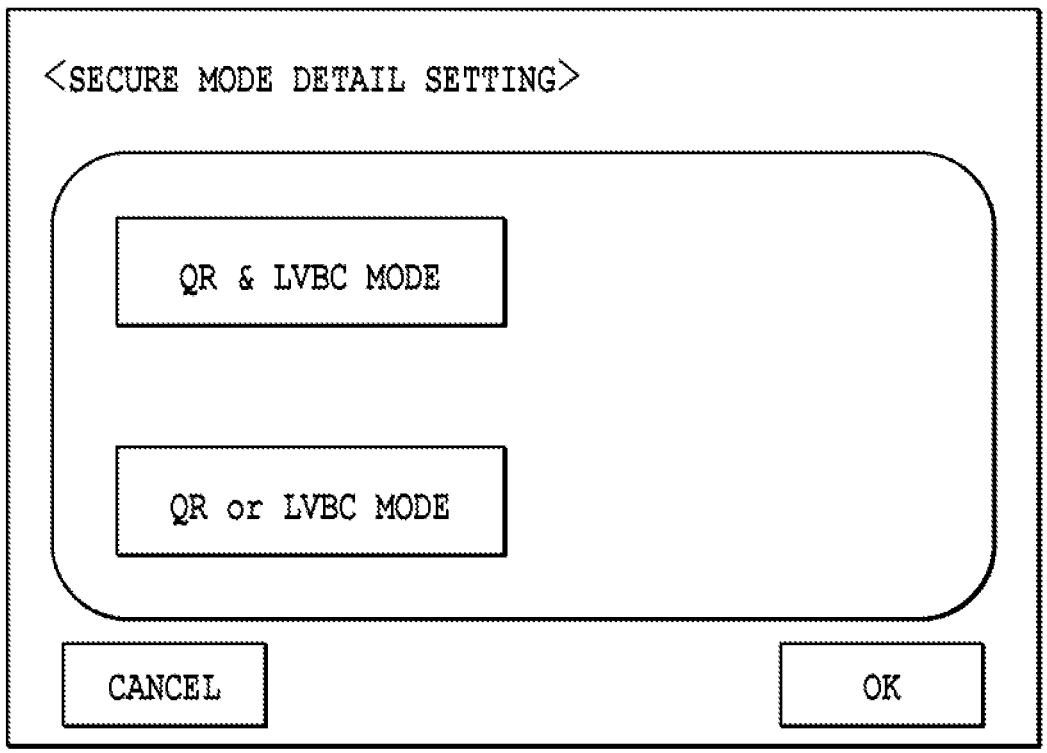
FIG. 11 is an example of "secure mode detail setting screen"

FIG. 11 is an example of "secure mode detail setting screen" which is displayed on the display unit 202 in the case that the "QR•LVBC" button is pressed down in FIG. 10.

The user, in the case that pressing down the "QR•LVBC" button in "two-dimensional code utilization detail setting screen" of FIG. 10, will consecutively set the content of the secure mode via the "secure mode detail setting screen" of FIG. 11.

Initial setting processing for the administrator setting which is executed when power is turned on is performed according to that of Embodiment 1 and detailed explanation will be omitted, and, in the following, there will be explained a flow in the case that the document is duplicated in the MFP 200 according to the present embodiment.

Figure 12B:
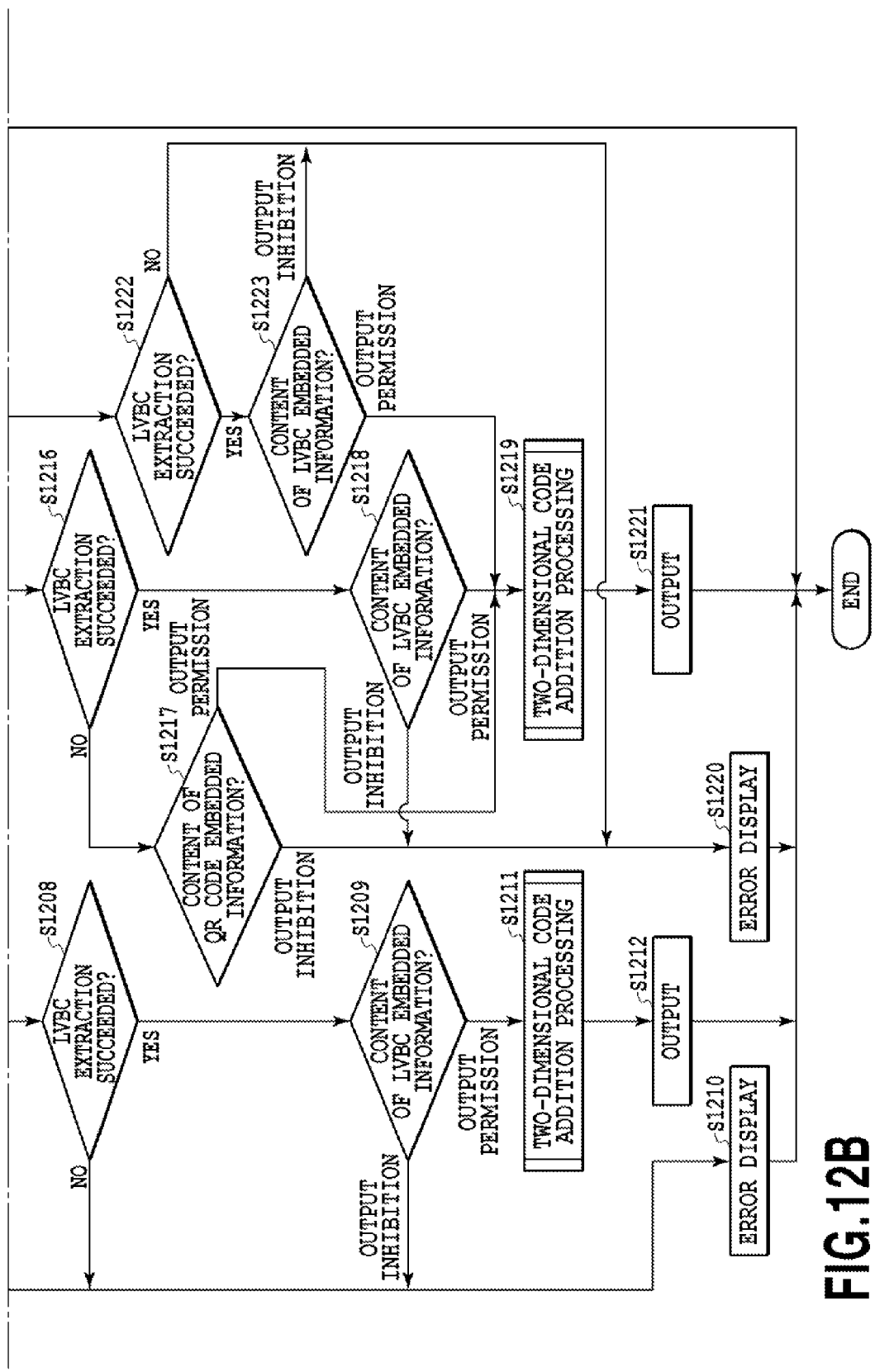
FIG. 12 is a diagram showing a relationship between FIGS. 12A and 12B, and FIGS. 12A and 12B are flowcharts showing a flow in the case that a document is duplicated in an MFP according to Embodiment 3.

FIGS. 12A and 12B are flowcharts showing a flow in the case that the document is duplicated in the MFP 200 according to the present embodiment. This processing is realized by the CPU 201 executing a program read from the HDD 206 into the RAM. Here, while the duplication will be explained, obviously this processing can be applied to other output modes such as the BOX storage. Note that, for a part common to Embodiment 1 which has been already described, explanation will be simplified or omitted and a different point will be mainly explained.

When the duplication request operation is received from the user, the document to be duplicated is scanned by the scanner unit 203, and the document image data is generated (step 1201).

Successively, it is determined whether setting of using the two-dimensional code is set or not, with reference to the information stored in the HDD (step 1202). In the case that the setting utilizing the two-dimensional code is set, QR code and/or LVBC detection processing is executed according to the setting content of the detection code setting (YES in step 1202, step 1203 to step 1205 and the like). On the other hand, in the case that the setting is the setting without utilizing the two-dimensional code, the printing processing is immediately executed using the document image data obtained by the scanning (NO in step 1202, step 1224).

<Case that the QR Code is Designated in the Detection Code Setting>

The process proceeds to step 604 in the flowchart of FIG. 6A according to Embodiment 1. Each processing step of step 604 and the following steps are the same as that explained in Embodiment 1.

<Case that the LVBC is Designated in the Detection Code Setting>

The process proceeds to step 605 in the flowchart of FIG. 6A according to Embodiment 1. Each processing step of step 605 and the following steps is the same as that explained in Embodiment 1.

<Case that Both of the QR Code and the LVBC are Designated in the Detection Code Setting>

First, it is determined whether the output control setting is the secure mode or the normal mode (step 1204). If the output control setting is the secure mode, the process proceeds to step 1205, and, if it is the normal mode, the process proceeds to processing A. Note that the processing A for the case of the normal mode will be explained by the use of another flowchart.

First, the case of the secure mode will be explained.
(Case of the QR & LVBC Mode Setting: Yes in Step 1205)

In this case, after the detection processing and the extraction processing have been executed for both of the QR code and the LVBC (step 1206), it is determined whether or not the embedded information has been able to be extracted from the QR code (step 1207). If the embedded information has not been able to be extracted from the QR code, a message that outputting is not possible is displayed on the display unit 202 (step 1210).

On the other hand, if the embedded information has been able to be extracted from the QR code, next, it is determined whether or not the embedded information has been able to be extracted from the LVBC (step 1208). In the case that the embedded information has been successfully extracted from the LVBC (YES in step 1208), if the extracted embedded information is the output permission information, the process goes to the two-dimensional code addition processing (step 1211) and the output processing is performed after that (step 1212). On the other hand, if the extracted embedded information is the output inhibition information, the message that outputting is not possible is displayed on the display unit 202 (step 1210).

(Case of QR or LVBC Mode Setting: NO in Step 1205)

In this case, after the detection processing and the extraction processing have been executed for both of the QR code and the LVBC (step 1214), it is determined whether or not the embedded information has been able to be extracted from the QR code (step 1215). In the case that the embedded information has been able to be extracted from the QR code, next, it is determined whether or not the embedded information has been able to be extracted from the LVBC (step 1216). In the case that the embedded information has been able to be extracted from the LVBC, the processing is performed according to the embedded information of the LVBC (step 1218 to step 1221). On the other hand, in the case that the embedded information has not been able to be extracted from the LVBC, the processing is performed according to the embedded information of the QR code (step 1217, step 1219 to step 1221).

On the other hand, in the case that it is determined that be embedded information has not been able to be extracted from the QR code in step 1215, next, it is determined whether or not the embedded information has been able to be extracted from the LVBC (step 1222). Then, in the case that the embedded information has been able to be extracted from the LVBC (YES in step 1222), the processing is performed according to the embedded information of the LVBC (step 1223, step 1219 to step 1221). On the other hand, in the case that the embedded information has not been able to be extracted also from the LVBC (NO in step 1222), the message that outputting is not possible is displayed on the display unit 202 (step 1220).

Figure 13:
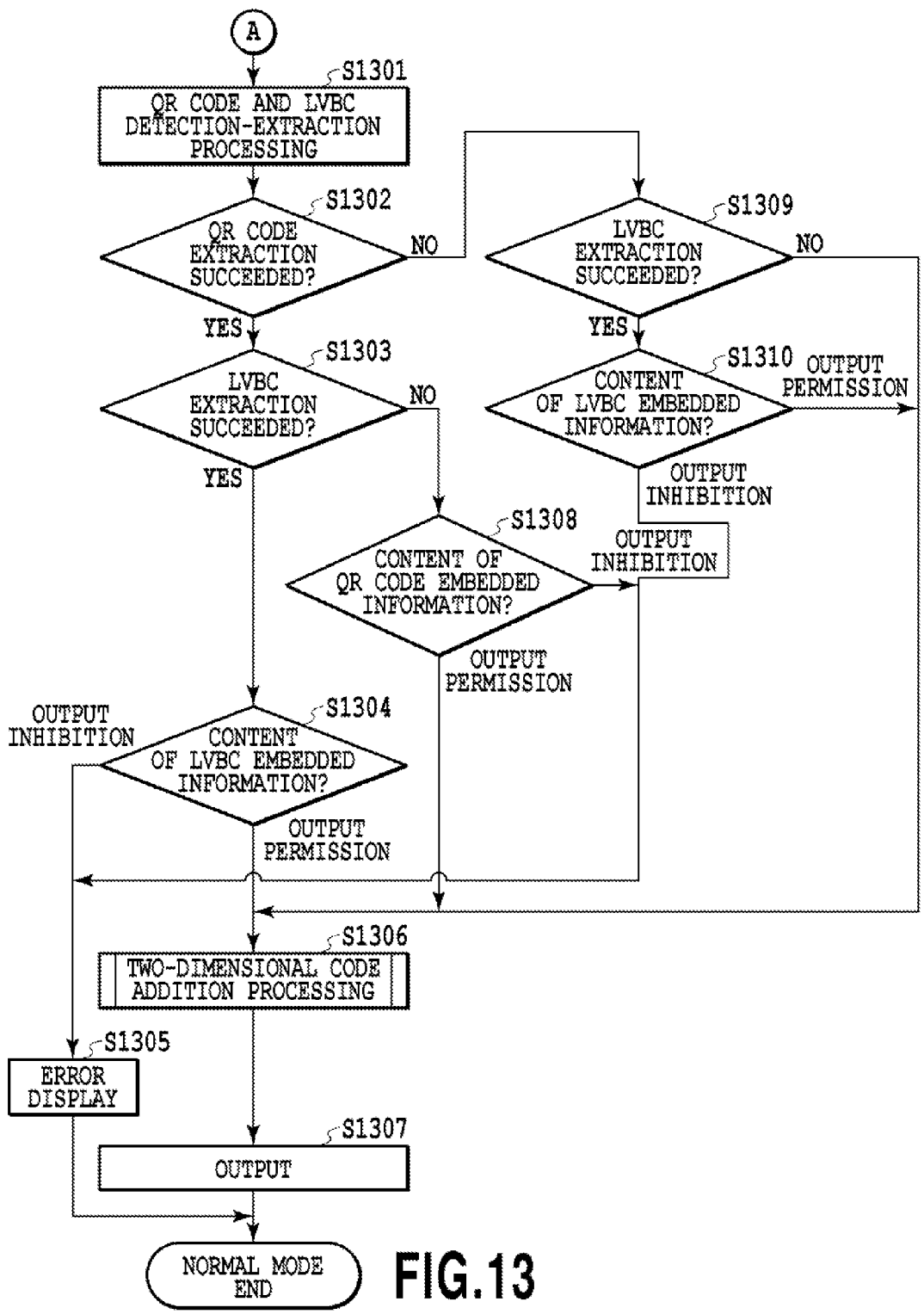
FIG. 13 is a flowchart showing a processing flow for a case of a normal mode in Embodiment 3.

Next the case of the normal mode will be explained.
FIG. 13 is a flowchart showing a flow of the processing A for the normal mode.

In this case, after the detection processing and the extraction processing have been executed for both of the QR code and the LVBC (step 1301), it is determined whether or not the embedded information has been able to be extracted from the QR code (step 1302). In the case that the embedded information has been able to be extracted from the QR code, next, it is determined whether or not the embedded information has been able to be extracted from the LVBC (step 1303). In the case that the embedded information has been able to be extracted from the LVBC, the processing is performed according to the embedded information of the LVBC (step 1304 to step 1307). On the other hand, in the case that the embedded information has not been able to be extracted from the LVBC, the processing is performed according to the embedded information of the QR code (step 1308, step 1305 to step 1307).

On the other hand, in the case that it is determined that the embedded information has not been able to be extracted from the QR code in step 1302, next, it is determined whether or not the embedded information has been able to be extracted from the LVBC (step 1309). Then, in the case that the embedded information has been able to be extracted from the LVBC (YES in step 1309), the processing is performed according to the embedded information of the LVBC (step 1310, step 1305 to step 1307). On the other hand, in the case that the embedded information has not been able to be extracted also from the LVBC (NO in step 1309), the process goes to the two-dimensional code addition processing (step 1306), and the output processing is performed after that (step 1307).

As described above, according to the present embodiment, for the QR•LVBC detection mode, the options of "QR LVBC mode" and "QR or LVBC mode" are further provided for the secure mode, and thereby it becomes possible to perform flexible operation according to the operation mode of the MFP.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-288010, filed Dec. 28, 2011, which is hereby incorporated by reference herein in its entirety.

What is claimed is:

1. A copier for scanning a document to obtain a document image, comprising:
a unit configured to
enable setting of any of a normal mode and a secure mode in a case that a first mode to search the document image for a partial code is set; and enable setting of the normal mode and disable setting of the secure mode in a case that a second mode to search the document image for a whole code is set, wherein the normal mode is a mode in which the document image with no code is printed, and the secure mode is a mode in which the document image with no code is not printed.

2. A program stored in a non-transitory computer readable storage medium for causing a computer to function as the copier according to claim 1.

3. The copier according to claim 1, wherein the copier, in a case that the normal mode is set, causes a user to select whether or not to add a code to the document image and performs setting depending on the selection; and in a case that the secure mode is set, does not cause the user to select whether or not to add a code to the document image and performs setting to add the code to the document image.

4. A method for controlling output of a document image, comprising the steps of:

enabling setting of any of a normal mode and a secure mode in a case that a first mode to search the document image for a partial code is set; and enabling setting of the normal mode and disabling setting of the secure mode in a case that a second mode to search the document image for a whole code is set, wherein the normal mode is a mode in which the document image with no code is printed, and the secure mode is a mode in which the document image with no code is not printed.

5. The method according to claim 4, wherein the method:

in a case that the normal mode is set, causes a user to select whether or not to add a code to the document image and performs setting depending on the selection; and in a case that the secure mode is set, does not cause the user to select whether or not to add a code to the document image and performs setting to add the code to the document image.

6. A method for controlling output of a document image, comprising:

a first mode setting step of setting either of a first mode to search the document image for a first type of code and a second mode to search the document image for a second type of code in determining whether or not to allow output of the document image; and a second mode setting step of (i) displaying a screen for allowing an administrator to select whether or not to permit printing of the document image with no code and setting the selected option, in a case that the first mode is set in the first mode setting step and (ii)

setting to permit printing of the document image with no code without allowing an administrator to select whether or not to permit printing of the document image with no code, in a case that the second mode is set in the first mode setting step, wherein the first type of code is smaller than the second type of code.

7. A copier for scanning a document to obtain a document image, comprising:

a unit configured to set either of a first mode to search the document image for a first type of code and a second mode to search the document image for a second type of code in determining whether or not to allow output of the document image; and a unit configured to (i) display a screen for allowing an administrator to select whether or not to permit printing of the document image with no code and to set the selected option, in a case that the first mode is set, and (ii) set to permit the printing of the document image with no code without allowing an administrator to select whether or not to permit printing of the document image with no code, in a case that the second mode is set, wherein the first type of code is a smaller than the second type of code.

* * * * *